;(12) United States Patent
Li et al.

(10) Patent No.: US 10,891,102 B2
(45) Date of Patent: *Jan. 12, 2021

(54) SCENE SOUND EFFECT CONTROL METHOD, AND ELECTRONIC DEVICE

(71) Applicant: GUANGDONG OPPO MOBILE TELECOMMUNICATIONS CORP., LTD., Guangdong (CN)

(72) Inventors: Yajun Li, Dongguan (CN); Gaoting Gan, Dongguan (CN); Hai Yang, Dongguan (CN); Guang Tu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/094,496

(22) PCT Filed: Jun. 16, 2017

(86) PCT No.: PCT/CN2017/088788
§ 371 (c)(1),
(2) Date: Oct. 18, 2018

(87) PCT Pub. No.: WO2017/215660
PCT Pub. Date: Dec. 21, 2017

(65) Prior Publication Data
US 2019/0102141 A1   Apr. 4, 2019

(30) Foreign Application Priority Data
Jun. 16, 2016   (CN) .......................... 2016 1 0447232

(51) Int. Cl.
G06F 17/00     (2019.01)
G06F 3/16      (2006.01)
G06F 16/65     (2019.01)

(52) U.S. Cl.
CPC ................ *G06F 3/165* (2013.01); *G06F 3/16* (2013.01); *G06F 3/162* (2013.01); *G06F 3/167* (2013.01); *G06F 16/65* (2019.01)

(58) Field of Classification Search
CPC ........... G06F 3/165; G06F 3/162; G06F 16/65
See application file for complete search history.

(56) References Cited

U.S. PATENT DOCUMENTS 8,300,841 B2   10/2012   Lindahl
8,768,494 B1 *  7/2014   Stroud ...................... H04S 7/30
                                                              700/94

(Continued)

FOREIGN PATENT DOCUMENTS

CN     102685712 A     9/2012
CN     103841495 A     6/2014

(Continued)

OTHER PUBLICATIONS

English Translation of the Written Opinion of the International Search Authority in international application No. PCT/CN2017/088788, dated Oct. 11, 2017.

(Continued)

*Primary Examiner* — Joseph Saunders, Jr.

(57) ABSTRACT

A method for controlling a scene sound effect and the electronic device includes after an device is turned on, starting a service having monitoring function; the device monitors the audio track of the device by means of the service having monitoring function, and determines whether the audio track includes an audio output; a mapping exists between the audio tracks and the applications in the device; if the device determines that the audio track includes an audio output, the device then determines, on the basis of the mapping, the application mapped to the audio track; the device obtains the scene sound effect corresponding to the application, and set the scene sound effect as the current (Continued)

sound effect of the device. The setting of the scene sound effects is autonomous, thereby simplifying operations and enhancing the utilization efficiency of the device while ensuring higher accuracy of scene sound effect.

16 Claims, 4 Drawing Sheets

(56) References Cited

U.S. PATENT DOCUMENTS

| | | | |
|---|---|---|---|
| 9,405,522 B2 | 8/2016 | Lee et al. | |
| 9,602,929 B2 | 3/2017 | Lindahl et al. | |
| 2006/0210097 A1* | 9/2006 | Yerrace | G06F 3/165 |
| | | | 381/119 |
| 2006/0274905 A1 | 12/2006 | Lindahl | |
| 2007/0206017 A1* | 9/2007 | Johnson | G09B 7/02 |
| | | | 345/473 |
| 2012/0072451 A1 | 3/2012 | Merrifield | |
| 2012/0310393 A1* | 12/2012 | Stewart | G06F 3/165 |
| | | | 700/94 |
| 2013/0044883 A1 | 2/2013 | Lindahl et al. | |
| 2014/0208310 A1 | 7/2014 | Lee et al. | |
| 2014/0235347 A1 | 8/2014 | Zhang | |
| 2014/0358262 A1* | 12/2014 | Yerrace | G06F 16/60 |
| | | | 700/94 |
| 2018/0256970 A1 | 9/2018 | Zhang | |

FOREIGN PATENT DOCUMENTS

| | | |
|---|---|---|
| CN | 104410748 A | 3/2015 |
| CN | 104778067 A | 7/2015 |
| CN | 104883642 A | 9/2015 |
| CN | 105468328 A | 4/2016 |
| CN | 105554548 A | 5/2016 |
| CN | 106126174 A | 11/2016 |
| EP | 2760175 A1 | 7/2014 |
| WO | 2014101637 A1 | 7/2014 |

OTHER PUBLICATIONS

Supplementary European Search Report in the European application No. 17812771.8, dated Apr. 29, 2019.
International Search Report in international application No. PCT/CN2017/086768, dated Oct. 11, 2017.
Written Opinion of the International Search Authority in international application No. PCT/CN2017/088788, dated Oct. 11, 2017.
First Office Action of the Indian application No. 201817047546, dated Nov. 25, 2020.

* cited by examiner ic equipment according to the mapping relationship; and a sound effect setting unit, configured to acquire a scene sound effect corresponding to the application and set a present sound effect of the electronic equipment to be the scene sound effect.

According to a third aspect, the embodiments of the disclosure provide electronic equipment, which includes: a processor, a memory and audio output equipment configured to output a scene sound effect, wherein the processor may be configured to execute any method provided by the embodiments of the disclosure.

According to a fourth aspect, the embodiments of the disclosure provide a computer-readable storage medium, which may store a computer program configured for electronic data exchange, wherein the computer program may be executed to implement any method of the embodiments of the disclosure.

According to a fifth aspect, the embodiments of the disclosure provide a program product, which may be executed to implement any method of the embodiments of the disclosure.

From the above technical solutions, it can be seen that the embodiments of the disclosure have the following advantages. By monitoring of the audiotrack, the mapping relationship between the audiotrack and the application and a correspondence between the scene sound effect and the application, a current application scene of the electronic equipment is accurately determined and the required scene sound effect is accurately determined. This process avoids human intervention to setting of the scene sound effect. Therefore, on the premise of ensuring relatively higher accuracy of the scene sound effect, operations are simplified, and utilization efficiency of the electronic equipment is improved.

SCENE SOUND EFFECT CONTROL METHOD, AND ELECTRONIC DEVICE

CROSS-REFERENCE TO RELATED APPLICATIONS

The present application claims priority of China Patent Application No. 201610447232.0, filed on Jun. 16, 2016, the contents of which are hereby incorporated by reference in its entirety.

TECHNICAL FIELD

The disclosure relates to the technical field of computers, and more particularly to a method for controlling a scene sound effect and electronic equipment.

BACKGROUND

A sound effect is an effect achieved by a sound and refers to a noise or sound added to enhance the sense of reality, atmosphere or dramatic information of a certain scene. The added noise or sound may include a musical sound and an effect sound, for example, a digital sound effect, an environmental sound effect and a Moving Picture Experts Group Audio Layer-3 (MP3) sound effect (ordinary sound effect and professional sound effect).

Accordingly, sound effects, sometimes also called audio effects, are artificial or enhanced sounds adopted to enhance sound processing for movies, electronic games, music or arts of other media or other contents. A scene sound effect is a sound effect applied for more specific application scene, involving a sound effect related to the current application scene.

SUMMARY

Embodiments of the disclosure provide a method for controlling a scene sound effect. After electronic equipment is turned on, a monitoring service is enabled. The electronic equipment monitors an audiotrack of the electronic equipment by means of the monitoring service to determine whether the audiotrack of the electronic equipment has audio output, the audiotrack of the electronic equipment having a mapping relationship with an application in the electronic equipment;

if the electronic equipment determines that the audiotrack of the electronic equipment has audio output, the application having the mapping relationship with the audiotrack of the electronic equipment is determined according to the mapping relationship; and the electronic equipment acquires a scene sound effect corresponding to the application and sets a sound effect of the electronic equipment to be the scene sound effect.

According to a second aspect, the embodiments of the disclosure provide electronic equipment, which includes a monitoring control unit, configured to, after the electronic equipment is turned on, enable service with a monitoring function; a monitoring unit, configured to monitor an audiotrack of the electronic equipment by means of the monitoring service to determine whether the audiotrack of the electronic equipment has audio output, the audiotrack of the electronic equipment having a mapping relationship with an application in the electronic equipment;

an application determination unit, configured to, if the monitoring unit determines that the audiotrack of the electronic equipment has audio output, determine the application

BRIEF DESCRIPTION OF DRAWINGS

The drawings required to be used in descriptions about the embodiments will be briefly introduced below.

DETAILED DESCRIPTION

In order to make the purpose, technical solutions and advantages of the disclosure, the disclosure will further be described below in combination with the drawings in detail. Apparently, the described embodiments are not all embodiments but part of embodiments of the disclosure. All other embodiments obtained by those of ordinary skilled in the art on the basis of the embodiments in the disclosure without creative work shall fall within the scope of protection of the disclosure.

Adoption of different sound processing technologies for sound effects in different scenes may achieve different effects, so that an auditory experience of a user may be greatly improved by increasing a recognition rate of an application scene and setting a corresponding sound effect mode.

At present, a scene sound effect may include a sound effect of a music playing application scene, a sound effect of a video playing scene or the like. Control over a scene sound effect is manually set by the user, and a specific flow is as follows.

Electronic equipment acquires the scene sound effect manually input/selected by the user by means of an interaction interface, and then the electronic equipment sets a current scene sound effect to be the scene sound effect manually input/selected by the user.

Accuracy of the scene sound effect set above is relatively higher. However, it is troublesome in operation, and utilization efficiency of the electronic equipment is relatively lower.

Figure 1:
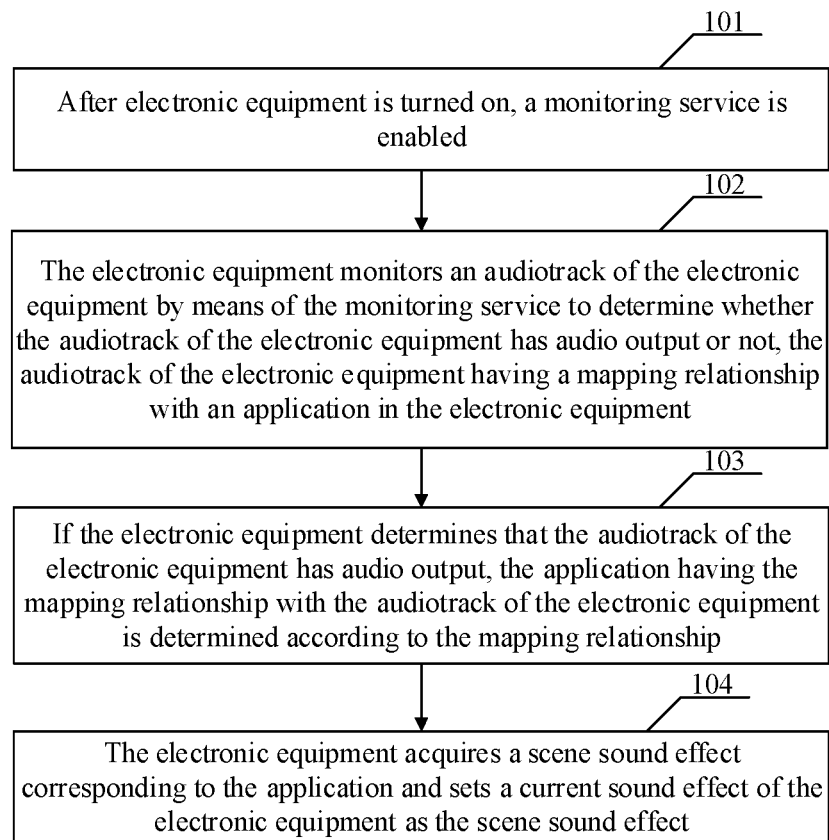
FIG. 1 is a flowchart of a method according to an embodiment of the disclosure.

An embodiment of the disclosure provides a method for controlling a scene sound effect. As shown in FIG. 1, the method includes the following operations.

In 101, after electronic equipment is turned on, a monitoring service is enabled.

In the embodiment, the monitoring service may be implemented by a hardware entity and may also be based on a software function of the hardware entity. There are no exclusive limits made in the embodiment of the disclosure.

In 102, the electronic equipment monitors an audiotrack of the electronic equipment by means of the monitoring service to determine whether the audiotrack of the electronic equipment has audio output, the audiotrack of the electronic equipment having a mapping relationship with an application in the electronic equipment.

Parallel "tracks" seen in sequencer software are audiotracks. One audiotrack corresponds to one part of music. Therefore, each audiotrack defines an attribute of the audiotrack, for example, a tone color of the audiotrack, a tone color library, a channel number, an input/output port and a volume. The mapping relationship between the audiotrack and the application may be a one-to-one correspondence. The application mentioned herein should be understood as a generalized application, for example, application software, a client of the application, a name of the application or a type of the application. This depends on content to which the scene sound effect is finally required to correspond. For example, if the scene sound effect corresponds to a kind of applications, the application should be understood as the application type herein. If the scene sound effect accurately corresponds to certain application software, the application should be understood as the application software herein.

In 103, if the electronic equipment determines that the audiotrack of the electronic equipment has audio output, the application having the mapping relationship with the audiotrack of the electronic equipment is determined according to the mapping relationship.

For how specifically to monitor and determine whether the audiotrack has audio output, there are no exclusive limits made in the embodiment of the disclosure. If the monitoring process recorded above is implemented by means of software service, the monitoring service may be enabled in an application layer to monitor the audiotrack.

In 104, the electronic equipment acquires a scene sound effect corresponding to the application and sets a current sound effect of the electronic equipment to be the scene sound effect.

After the scene sound effect is set, audio output device of the electronic equipment may be used. The audio output equipment may include a sound card and an audio output interface or include the sound card and a loudspeaker. Herein, the audio output interface may be connected to external equipment such as a loudspeaker or an earphone.

According to the embodiment of the disclosure, by means of monitoring of the audiotrack, the mapping relationship between the audiotrack and the application and a correspondence between a scene sound effect and an application, a current application scene of the electronic equipment is accurately determined and the required scene sound effect is accurately determined. This process avoids human intervention to setting of the scene sound effect, so that, on the premise of ensuring relatively higher accuracy of the scene sound effect, operations are simplified, and utilization efficiency of the electronic equipment is improved.

In the embodiment of the disclosure, it is unnecessary to set different scene sound effects for all applications, thereby reducing complexity of the scene sound effects. Specifically, the audiotrack of the electronic equipment having the mapping relationship with the application in the electronic equipment includes that the audiotrack of the electronic equipment forms a mapping relationship with a client of the application in the electronic equipment.

In the embodiment of the disclosure, it is unnecessary to set different scene sound effects for all applications, so as to reduce complexity of the scene sound effects. Specifically, the audiotrack of the electronic equipment having the mapping relationship with the client of the application in the electronic equipment includes that the audiotrack of the electronic equipment forms a mapping relationship with an application type of the client of the application in the electronic equipment.

According to the embodiment, application software is substantially classified, and different types of application software require different sound effects. For example, game software and music software require different sound effects, and a real-time strategy game and a casual game require different sound effects.

Since accuracy of the mapping relationship between the audiotrack and the application has relatively significant influence on final selection of the scene sound effect, the embodiment of the disclosure further provides the following solution: before the application having the mapping relationship with the audiotrack of the electronic equipment is determined according to the mapping relationship, the method further includes that:

the electronic equipment establishes a communication connection with a server located at a network side and sends a query request to the server at the network side through the communication connection, the query request containing a name of the client or a name of the application, and classification information of the client or classification information about classifying clients by names of applications being stored in the server at the network side.

The operation that the application having the mapping relationship with the audiotrack of the electronic equipment is determined according to the mapping relationship includes that: the electronic equipment receives an application type returned by the server, the application type being determined by the server at the network side according to the classification information of the client or the classification information about classifying clients by names of applications.

The operation that the electronic equipment acquires the scene sound effect corresponding to the application includes that: the electronic equipment acquires the scene sound effect corresponding to the application type.

In the embodiment, the application type is mapped with the scene sound effect, and a mapping relationship is stored in the server for convenient maintenance. The server may be a cloud server. The mapping relationship may be maintained and updated by an operating company and may also be customized by a user. There are no exclusive limits made in the embodiment of the disclosure. The query request may be implemented by a socket. Two programs on a network implement data exchange through a bidirectional communication connection, and one end of the bidirectional communication connection is called a socket.

Furthermore, on the basis of a personalized requirement of the user, the embodiment of the disclosure provides the following solution.

The electronic equipment updates the classification information of the client or classification information about classifying clients by names of applications, stored in the server at the network side, through the communication connection.

Optionally, the application type includes at least one of a music player, a video player or a game application. The application type forms a correspondence with the scene sound effect.

The operation that the electronic equipment acquires the scene sound effect corresponding to the application includes that: the electronic equipment determines the scene sound effect corresponding to the application type of the application according to the correspondence between the application type and the scene sound effect.

It should be understood that there are many application types and the examples listed above are not all application types. In addition, the above application types may further be subdivided. For example, the game application may further be subdivided into a real-time strategy game application, a casual game application or the like.

Figure 2:
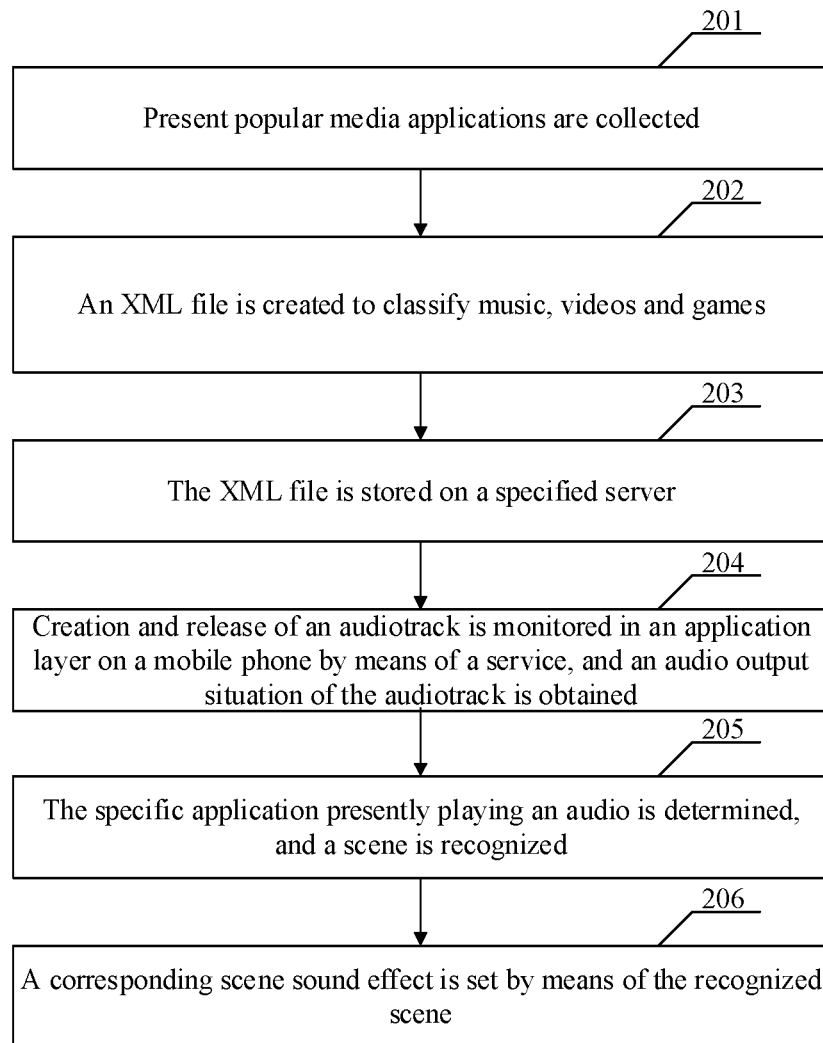
FIG. 2 is a flowchart of a method according to an embodiment of the disclosure.

As shown in FIG. 2, an embodiment of the disclosure further provides another more specific method flow example for description, including the following operations.

In 201, popular media applications are collected, for example, music, video players and games.

In 202, an Extensible Markup Language (XML) file is created to classify music, videos and games.

In 203, The XML file is stored on a specified server. Related maintenance work such as modification, updating, downloading and uploading may be executed on the XML file.

In 204, creation and release of an audiotrack is monitored in an application layer in a mobile phone by means of a service, and an audio output situation of the audiotrack is obtained.

In 205, each audiotrack may be bound with a client (the client may also be called a user end, referring to a program corresponding to the server and providing local service for a customer, which is one of application software), and the client is compared with applications in the maintained XML file for analysis to learn about which specific application is playing an audio, thereby achieving a purpose of recognizing a scene.

In 206, a corresponding scene sound effect is set by means of the recognized scene.

Figure 3:
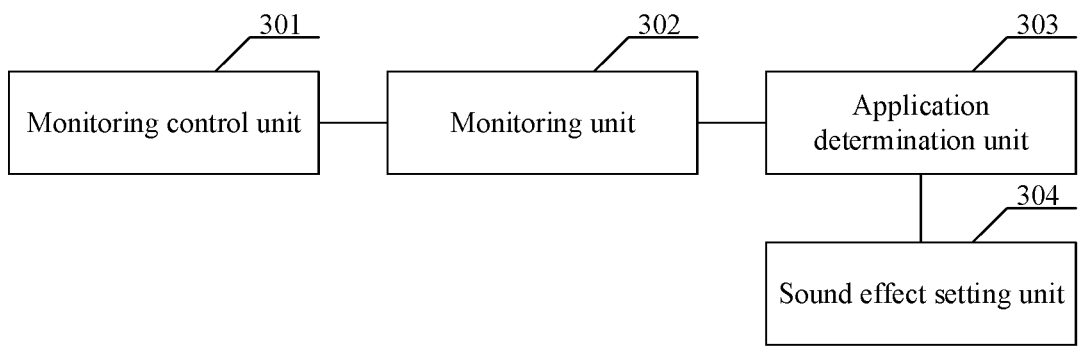
FIG. 3 is a structure diagram of electronic equipment according to an embodiment of the disclosure.

An embodiment of the disclosure further provides electronic equipment, as shown in FIG. 3.

A monitoring control unit 301 is configured to, after the electronic equipment is turned on, enable a monitoring service.

A monitoring unit 302 is configured to monitor an audiotrack of the electronic equipment by means of the monitoring service to determine whether the audiotrack of the electronic equipment has audio output, the audiotrack of the electronic equipment having a mapping relationship with an application in the electronic equipment.

An application determination unit 303 is configured to, if the monitoring unit 302 determines that the audiotrack of the electronic equipment has audio output, determine the application having the mapping relationship with the audiotrack of the electronic equipment according to the mapping relationship.

A sound effect setting unit 304 is configured to acquire a scene sound effect corresponding to the application and set a sound effect of the electronic equipment to be the scene sound effect.

In the embodiment, the monitoring service may be implemented by a hardware entity and may also be based on a software function of the hardware entity, and there are no uniqueness limits made in the embodiment of the disclosure.

Parallel "tracks" seen in sequencer software are audiotracks. One audiotrack corresponds to one part of music. Therefore, each audiotrack defines an attribute of the audiotrack, for example, a tone color of the audiotrack, a tone color library, a channel number, an input/output port and a volume. The mapping relationship between the audiotrack and the application may be a one-to-one correspondence. The application mentioned herein should be understood as a generalized application, for example, application software, a client of the application, a name of the application or a type of the application. This depends on content to which the scene sound effect is finally required to correspond. For example, if the scene sound effect corresponds to a kind of applications, the application should be understood as the application type herein. If the scene sound effect accurately corresponds to certain application software, the application should be understood as the application software herein.

For how specifically to monitor and determine whether the audiotrack has audio output, there are no exclusive limits made in the embodiment of the disclosure. If the monitoring process recorded above is implemented by means of software service, the monitoring service may be enabled in an application layer to monitor the audiotrack.

After the scene sound effect is set, an audio output device of the electronic equipment may be used. The audio output equipment may include a sound card and an audio output interface or include the sound card and a loudspeaker. Herein, the audio output interface may be connected to external equipment such as a loudspeaker or an earphone.

According to the embodiment of the disclosure, by means of monitoring of the audiotrack, the mapping relationship between the audiotrack and the application and a correspondence between a scene sound effect and an application, a current application scene of the electronic equipment is accurately determined and the required scene sound effect is accurately determined. This process avoids human intervention to setting of the scene sound effect, so that, on the premise of ensuring relatively higher accuracy of the scene sound effect, operations are simplified, and utilization efficiency of the electronic equipment is improved.

In the embodiment of the disclosure, it is unnecessary to set different scene sound effects for all applications, thereby reducing complexity of the scene sound effects. Specifically, the audiotrack of the electronic equipment having the mapping relationship with the application in the electronic equipment includes that the audiotrack of the electronic equipment forms a mapping relationship with a client of the application in the electronic equipment.

In the embodiment of the disclosure, it is unnecessary to set different scene sound effects for all applications, so as to reduce complexity of the scene sound effects. Specifically, the audiotrack of the electronic equipment having the mapping relationship with the client of the application in the electronic equipment includes that the audiotrack of the electronic equipment forms a mapping relationship with an application type of the client of the application in the electronic equipment.

According to the embodiment, application software is substantially classified, and different types of application software require different sound effects. For example, game software and music software require different sound effects, and a real-time strategy game and a casual game require different sound effects.

Figure 4:
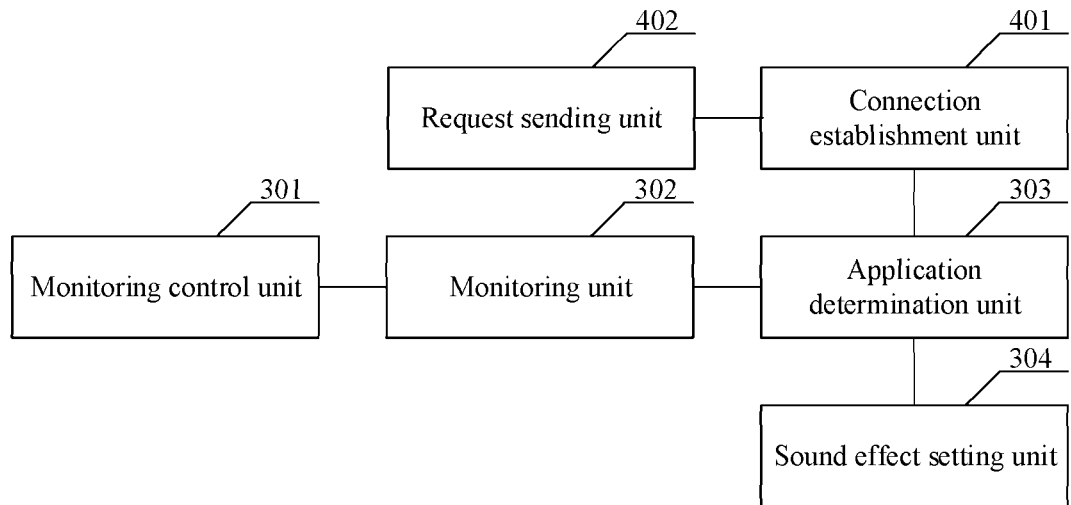
FIG. 4 is a structure diagram of electronic equipment according to an embodiment of the disclosure.

Since accuracy of the mapping relationship between the audiotrack and the application has relatively significant influence on final selection of the scene sound effect, the embodiment of the disclosure further provides the following solution. As shown in FIG. 4, the electronic equipment further includes a connection establishment unit 401, and a request sending unit 402.

The connection establishment unit 401 is configured to, before the application determination unit 303 determines the application having the mapping relationship with the audiotrack of the electronic equipment according to the mapping relationship, establish a communication connection with a server located at a network side.

The request sending unit 402 is configured to send a query request to the server on the network side through the communication connection, the query request containing a name of the client or a name of the application and classification information of the client or classification information about classifying clients by names of applications being stored in the server on the network side.

The application determination unit 303 is specifically configured to receive an application type returned by the server, the application type being determined by the server at the network side according to the classification information of the client or the classification information about classifying clients by names of applications.

The sound effect setting unit 304 is specifically configured to acquire the scene sound effect corresponding to the application type and set the current sound effect of the electronic equipment to be the scene sound effect.

In the embodiment, the application type is mapped with the scene sound effect, and a mapping relationship is stored in the server for convenient maintenance. The server may be a cloud server. The mapping relationship may be maintained and updated by an operating company and may also be customized by a user. There are no exclusive limits made in the embodiment of the disclosure. The query request may be implemented by a socket. Two programs on a network implement data exchange through a bidirectional communication connection, and one end of the bidirectional communication connection is called a socket.

Figure 5:
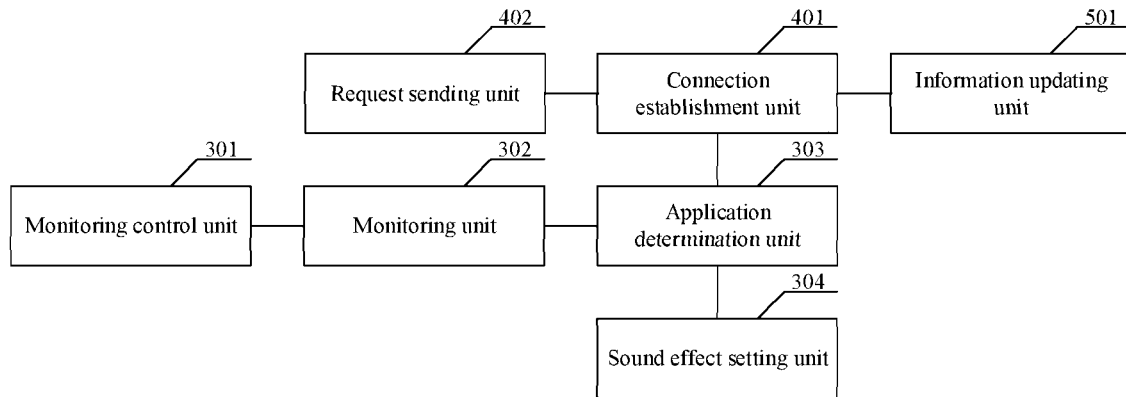
FIG. 5 is a structure diagram of electronic equipment according to an embodiment of the disclosure.

Furthermore, on the basis of a personalized requirement of the user, the embodiment of the disclosure provides the following solution. As shown in FIG. 5, the electronic equipment further includes an information updating unit 501.

The information updating unit 501 is configured to update the classification information of the client or classification information about classifying clients by names of applications, stored in the server at the network side, through the communication connection.

Optionally, the application type includes at least one of a music player, a video player or a game application. The application type forms a correspondence with the scene sound effect.

The sound effect setting unit 304 is specifically configured to determine the scene sound effect corresponding to the application type of the application according to the correspondence between the application type and the scene sound effect and set the current sound effect of the electronic equipment to be the scene sound effect.

It should be understood that there are many application types and the examples listed above are not all application types. In addition, the above application types may further be subdivided. For example, the game application may further be subdivided into a real-time strategy game application, a casual game application or the like.

Figure 6:
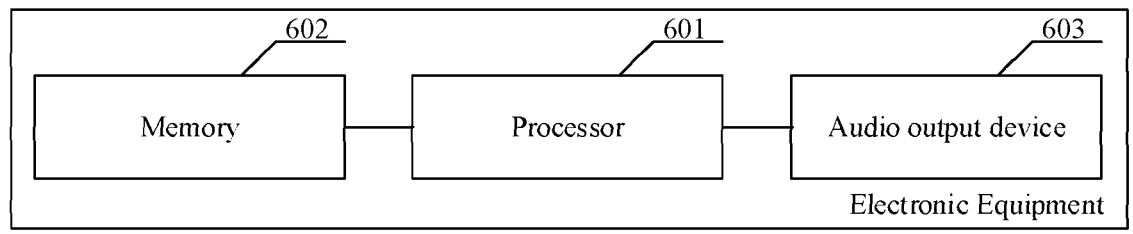
FIG. 6 is a structure diagram of electronic equipment according to an embodiment of the disclosure.

An embodiment of the disclosure further provides another electronic equipment As shown in FIG. 6, the electronic equipment includes a processor 601, a memory 602 and an audio output device 603 configured to output a scene sound effect. The memory 602 may be configured to provide a cache required by execution of data processing for the processor 601, and may further provide a storage space for audio data of the scene sound effect. The audio data of the scene sound effect may be from a network side. The local memory 602 of the electronic equipment may provide a downloading buffer memory space.

The processor 601 is configured to, after the electronic equipment is turned on, enable a monitoring service, monitor an audiotrack of the electronic equipment by means of the monitoring service to determine whether the audiotrack of the electronic equipment has audio output, the audiotrack of the electronic equipment having a mapping relationship with an application in the electronic equipment, if it is determined that the audiotrack of the electronic equipment has audio output, determine the application having the mapping relationship with the audiotrack of the electronic equipment according to the mapping relationship, acquire a scene sound effect corresponding to the application and set a current sound effect of the electronic equipment to be the scene sound effect.

In the embodiment, the monitoring service may be implemented by a hardware entity and may also be based on a software function of the hardware entity. There are no exclusive limits made in the embodiment of the disclosure.

Parallel "tracks" seen in sequencer software are audiotracks. One audiotrack corresponds to one part of music. Therefore, each audiotrack defines an attribute of the audiotrack, for example, a tone color of the audiotrack, a tone color library, a channel number, an input/output port and a volume. The mapping relationship between the audiotrack and the application may be a one-to-one correspondence. The application mentioned herein should be understood as a generalized application, for example, application software, a client of the application, a name of the application or a type of the application. This depends on content to which the scene sound effect is finally required to correspond. For example, if the scene sound effect corresponds to a kind of applications, the application should be understood as the application type herein. If the scene sound effect accurately corresponds to certain application software, the application should be understood as the application software herein.

For how specifically to monitor and determine whether the audiotrack has audio output, there are no exclusive limits made in the embodiment of the disclosure. If the monitoring process recorded above is implemented by means of software service, the monitoring service may be enabled in an application layer to monitor the audiotrack.

After the scene sound effect is set, an audio output device of the electronic equipment may be used. The audio output equipment may include a sound card and an audio output interface or include the sound card and a loudspeaker. Herein, the audio output interface may be connected to external equipment such as a loudspeaker or an earphone.

According to the embodiment of the disclosure, by means of monitoring of the audiotrack, the mapping relationship between the audiotrack and the application and a correspondence between a scene sound effect and an application, a current application scene of the electronic equipment is accurately determined and the required scene sound effect is accurately determined. This process avoids human intervention to setting of the scene sound effect, so that, on the premise of ensuring relatively higher accuracy of the scene sound effect, operations are simplified, and utilization efficiency of the electronic equipment is improved.

In the embodiment of the disclosure, it is unnecessary to set different scene sound effects for all applications, thereby reducing complexity of the scene sound effects. Specifically, the audiotrack of the electronic equipment having the mapping relationship with the application in the electronic equipment includes that the audiotrack of the electronic equipment forms a mapping relationship with a client of the application in the electronic equipment.

In the embodiment of the disclosure, it is unnecessary to set different scene sound effects for all applications, so as to reduce complexity of the scene sound effects. Specifically, the audiotrack of the electronic equipment having the mapping relationship with the client of the application in the electronic equipment includes that the audiotrack of the electronic equipment forms a mapping relationship with an application type of the client of the application in the electronic equipment.

According to the embodiment, application software is substantially classified, and different types of application software require different sound effects. For example, game software and music software require different sound effects, and a real-time strategy game and a casual game require different sound effects.

Since accuracy of the mapping relationship between the audiotrack and the application has relatively significant influence on final selection of the scene sound effect, the embodiment of the disclosure further provides the following solution. The processor 601 is further configured to, before determining the application having the mapping relationship with the audiotrack of the electronic equipment according to the mapping relationship, establish a communication connection with a server located at a network side and send a query request to the server at the network side through the communication connection, the query request containing a name of the client or a name of the application and classification information of the client or classification information about classifying clients by names of applications being stored in the server on the network side.

The processor 601 is configured to receive an application type returned by the server, the application type being determined by the server at the network side according to the classification information of the client or the classification information about classifying clients by names of applications.

The processor 601 is configured to acquire the scene sound effect corresponding to the application type.

In the embodiment, the application type is mapped with the scene sound effect, and a mapping relationship is stored in the server for convenient maintenance. The server may be a cloud server, and the mapping relationship may be maintained and updated by an operating company and may also be customized by a user. There are no exclusive limits made in the embodiment of the disclosure. The query request may be implemented by a socket. Two programs on a network implement data exchange through a bidirectional communication connection, and one end of the bidirectional communication connection is called a socket.

Furthermore, on the basis of a personalized requirement of the user, the embodiment of the disclosure provides the following solution. The processor 601 is further configured to update the classification information of the client or classification information about classifying clients by names of applications, stored in the server at the network side, through the communication connection.

Optionally, the application type includes at least one of a music player, a video player or a game application. The application type forms a correspondence with the scene sound effect.

The processor 601 is configured to determine the scene sound effect corresponding to the application type of the application according to the correspondence between the application type and the scene sound effect.

It should be understood that there are many application types and the examples listed above are not all application types. In addition, the above application types may further be subdivided. For example, the game application may further be subdivided into a real-time strategy game application, a casual game application or the like.

Figure 7:
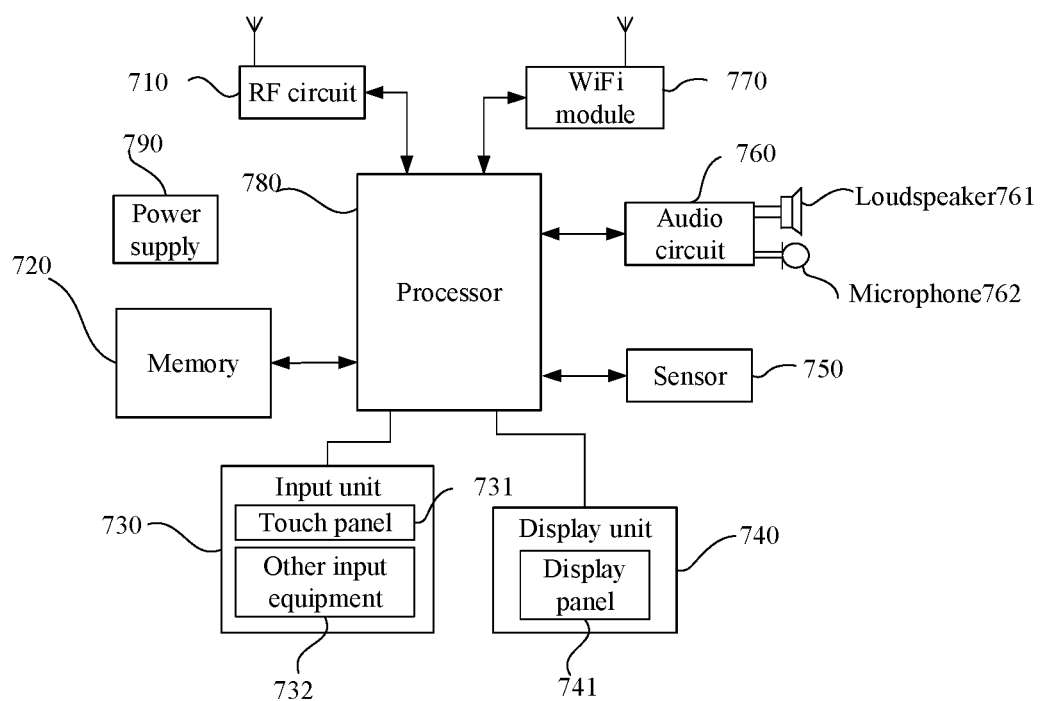
FIG. 7 is a structure diagram of terminal equipment according to an embodiment of the disclosure.

An embodiment of the disclosure further provides terminal equipment. As shown in FIG. 7, for convenient description, only parts related to the embodiment of the disclosure are shown, and specific technical details which are not described refer to parts of the method of the embodiments of the disclosure. The terminal equipment may be any terminal equipment including a mobile phone, a tablet computer, a Personal Digital Assistant (PDA), a Point of Sales (POS), a vehicle-mounted computer or the like. For example, the terminal equipment is a mobile phone.

FIG. 7 is a block diagram of part of a structure of a mobile phone related to terminal equipment according to an embodiment of the disclosure. Referring to FIG. 7, the mobile phone includes components such as a Radio Frequency (RF) circuit 710, a memory 720, an input unit 730, a display unit 740, a sensor 750, an audio circuit 760, a Wireless Fidelity (WiFi) module 770, a processor 780 and a power supply 790. Those skilled in the art should know that the structure of the mobile phone shown in FIG. 7 is not intended to limit the mobile phone and may include components more or fewer than those shown in the figure or some components are combined or different component arrangements are adopted.

Each component of the mobile phone will be specifically introduced below in combination with FIG. 7.

The RF circuit 710 may be configured to receive and send signals in an information receiving and sending or communication process, particularly after receiving downlink information of a base station, send it to the processor 780 for processing and, in addition, send designated uplink data to the base station. The RF circuit 710 usually includes, but not limited to, an antenna, at least one amplifier, a transceiver, a coupler, a Low Noise Amplifier (LNA), a duplexer or the like. In addition, the RF circuit 710 may also communicate with a network and other equipment in a wireless communication manner. Any communication standard or protocol may be used for wireless communication, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an electronic mail, Short Messaging Service (SMS) or the like.

The memory 720 may be configured to store a software program and a module, and the processor 780 operates the software program and module stored in the memory 720, thereby executing various function applications and data processing of the mobile phone. The memory 720 may mainly include a program storage region and a data storage region, wherein the program storage region may store an operating system, an application program required by at least one function (for example, a sound playing function and an image playing function) or the like, and the data storage region may store data (for example, audio data and a phonebook) created according to use of the mobile phone or the like. In addition, the memory 720 may include a high-speed random access memory, and may further include a non-volatile memory, for example, at least one disk storage device, flash memory device or other volatile solid-state storage device.

The input unit 730 may be configured to receive input digital or character information and generate key signal input related to user setting and function control of the mobile phone. Specifically, the input unit 730 may include a touch panel 731 and other input equipment 732. The touch panel 731, also called as a touch screen, may collect a touch operation (for example, operation executed by a user with any proper object or accessory such as a finger and a stylus on the touch panel 731 or nearby the touch panel 731) of the user thereon or nearby and drive a corresponding connection device according to a preset program. Optionally, the touch panel 731 may include two parts, i.e., a touch detection device and a touch controller, wherein the touch detection device detects a touch orientation of the user, detects a signal generated by a touch operation and sends the signal to the touch controller; and the touch controller receives touch information from the touch detection device and converts it into a contact coordinate for sending to the processor 780, and may receive and execute a command sent by the processor 780. In addition, the touch panel 731 may be implemented into multiple types such as a resistance type, a capacitance type, an infrared type and a surface acoustic wave type. Besides the touch panel 731, the input unit 730 may further include the other input equipment 732. Specifically, the other input equipment 732 may include, but not limited to, one or more of a physical keyboard, a function key (for example, a volume control key and an on-off key), a trackball, a mouse, a joystick or the like.

The display unit 740 may be configured to display information input by the user or information provided for the user and various menus of the mobile phone. The display unit 740 may include a display panel. Optionally, the display panel 741 may be configured in form of a Liquid Crystal Display (LCD), an Organic Light-Emitting Diode (OLED) or the like. Furthermore, the touch panel 731 may cover the display panel 741, the touch panel 731, after detecting the touch operation executed thereon or nearby, transmits it to the processor 780 to determine a type of a touch event, and the processor 780 subsequently provides corresponding visual output on the display panel 741 according to the type of the touch event. Although the touch panel 731 and display panel 741 in FIG. 7 realize input and output functions of the mobile phone as two independent components, the touch panel 731 and the display panel 741 may be integrated to realize the input and output functions of the mobile phone in some embodiments.

The mobile phone may further include at least one sensor 750, for example, a light sensor, a motion sensor and another sensor. Specifically, the light sensor may include an environmental light sensor and a proximity sensor. The environmental light sensor may regulate brightness of the display panel 741 according to brightness of environmental light, and the proximity sensor may turn off the display panel 741 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function or the like (for example, a pedometer and knocking). Other sensors, for example, a gyroscope, a barometer, a hygrometer, a thermometer and an infrared sensor, which may be configured in the mobile phone will not be elaborated herein.

The audio circuit 760, a loudspeaker 761 and a microphone 762 may provide an audio interface between the user and the mobile phone. The audio circuit 760 may transmit an electric signal converted from received audio data to the loudspeaker 761, and then the loudspeaker 761 converts it into a sound signal for output. On the other aspect, the microphone 762 converts a collected sound signal into an electric signal, and then the audio circuit 760 receives and converts it into audio data and outputs the audio data to the processor 780 for processing and sending to, for example, another mobile phone through the RF circuit 710 or outputs the audio data to the memory 720 for further processing.

WiFi is a short-distance wireless communication technology. The mobile phone may help the user to receive and send an electronic mail, browse a webpage, access streaming media or the like through the WiFi module 770, and provides wireless broadband Internet access for the user. Although the WiFi module 770 is shown in FIG. 7, it can be understood that it is not a necessary component of the mobile phone and may completely be omitted according to a requirement without changing the scope of the essence of the disclosure.

The processor 780 is a control center of the mobile phone, connects each part of the whole mobile phone by virtue of various interfaces and lines and executes various functions and data processing of the mobile phone by operating or executing the software program and/or module stored in the memory 720 and calling data stored in the memory 720, thereby monitoring the whole mobile phone. Optionally, the processor 780 may include one or more processing units. Preferably, the processor 780 may integrate an application processor and a modulation and demodulation processor, wherein the application processor mainly processes the operating system, a user interface, an application program or the like, and the modulation and demodulation processor mainly processes wireless communication. It can be understood that the modulation and demodulation processor may also not be integrated into the processor 780.

The mobile phone further includes the power supply 790 (for example, a battery) supplying power to each component. Preferably, the power supply may be logically connected with the processor 780 through a power management system, thereby realizing functions of charging and discharging management, power consumption management or the like through the power management system.

Although not shown in the figure, the mobile phone may further include a camera, a Bluetooth module or the like, which will not be elaborated herein.

In the embodiment of the disclosure, the processor 780 of the terminal equipment further has functions corresponding to the processor 601 in the abovementioned embodiment.

It is noted that, in the embodiment of the electronic equipment, each included unit is only divided according to function logic but is not limited to abovementioned division as long as the corresponding function may be realized. In addition, a specific name of each functional unit is only for convenient distinction and not intended to limit the scope of protection of the disclosure.

In addition, those of ordinary skilled in the art should understand that implementation of all or part of the steps in each method embodiment may be completed by related hardware instructed by a program, the corresponding program may be stored in a computer-readable storage medium, and the abovementioned storage medium may be a read-only memory, a magnetic disk, an optical disk or the like.

The invention claimed is:

1. A method for controlling a scene sound effect, performed by electronic equipment, comprising:
   determining whether an audiotrack of the electronic equipment has audio output, the audiotrack having a mapping relationship with an application in the electronic equipment;
   in the case that it is determined that the audiotrack has audio output, establishing a communication connection with a server located at a network side and sending a query request to the server at the network side through the communication connection, the query request comprising a name of a client or a name of the application, and classification information of the client or classification information about classifying clients by names of applications being stored in the server at the network side;
   receiving a type of the application returned by the server, the type of the application being determined by the server at the network side according to the classification information of the client or the classification information about classifying clients by names of applications;
   acquiring a type of a scene sound effect corresponding to the type of the application; and
   setting a sound effect of the electronic equipment to be the scene sound effect corresponding to the type of the scene sound effect.

2. The method according to claim 1, further comprising:
   updating, by the electronic equipment, the classification information of the client or classification information about classifying clients by names of applications, stored in the server at the network side, through the communication connection.

3. The method according to claim 1, wherein the application comprises at least one of a music player, a video player or a game application; and the type of the application has a correspondence with the type of the scene sound effect; and
   acquiring the type of the scene sound effect corresponding to the type of the application comprises:
   determining, by the electronic equipment, the type of the scene sound effect corresponding to the type of the application according to the correspondence between the type of the application and the type of the scene sound effect.

4. The method according to claim 3, wherein the game application comprises at least one of a real-time strategy game application or a casual game application.

5. The method according to claim 1, wherein the scene sound effect comprises: scene sound effects of music, a video or a game; and the method further comprises: creating an Extensible Markup Language (XML) file to classify the music, the video or the game, and sending the XML file to a specified server.

6. The method according to claim 5, further comprising:
   monitoring, by a monitoring service in an application layer, creation and release of the audiotrack to obtain an audio output situation of the audiotrack.

7. The method according to claim 6, wherein the audiotrack having the mapping relationship with the application in the electronic equipment comprises:
   each audiotrack being bound with an application; and
      acquiring the type of the scene sound effect corresponding to the type of the application comprises:
         determining the type of the scene sound effect corresponding to the created audiotrack according to the XML file.

8. The method according to claim 1, wherein the audiotrack has at least one attribute, and the at least one attribute comprises at least one of: a tone color of the audiotrack, a tone color library, a channel number, an input/output port, or a volume.

9. A device for controlling a scene sound effect, for use in electronic equipment, comprising:
   a processor;
   a memory for storing instructions executable by the processor,
   wherein the processor is configured to execute the instructions to
   determine whether an audiotrack of the electronic equipment has audio output, the audiotrack having a mapping relationship with an application in the electronic equipment;
   in the case that it is determined that the audiotrack has audio output, establish a communication connection with a server located at a network side and send a query request to the server at the network side through the communication connection, the query request comprising a name of a client or a name of the application, and classification information of the client or classification information about classifying clients by names of applications being stored in the server at the network side;
   receive a type of the application returned by the server, the type of the application being determined by the server at the network side according to the classification information of the client or the classification information about classifying clients by names of applications;
   acquire a type of a scene sound effect corresponding to the type of the application; and
   set a sound effect of the electronic equipment to be the scene sound effect corresponding to the type of the scene sound effect.

10. The device according to claim 9, wherein the processor is further configured to update the classification information of the client or classification information about classifying clients by names of applications, stored in the server at the network side, through the communication connection.

11. The device according to claim 9, wherein the application comprises at least one of a music player, a video player or a game application; and the type of the application has a correspondence with the type of the scene sound effect; and wherein the processor is configured to determine the type of the scene sound effect corresponding to the type of the application according to the correspondence between the type of the application and the type of the scene sound effect, and set the sound effect of the electronic equipment to be the scene sound effect corresponding to the type of the scene sound effect.

12. The device according to claim 9, wherein the scene sound effect comprises: scene sound effects of music, a video or a game; and wherein the processor is further configured to create an Extensible Markup Language (XML) file to classify the music, the video or the game and send the XML file to a specified server.

13. The device according to claim 12, wherein the processor is configured to monitor creation and release of the audiotrack by a monitoring service in an application layer to obtain an audio output situation of the audiotrack.

14. The device according to claim 13, wherein the audiotrack having the mapping relationship with the application in the electronic equipment comprises: each audiotrack being bound with an application; and wherein the processor is further configured to determine the type of the scene sound effect corresponding to the created audiotrack according to the XML file.

15. The device according to claim 9, wherein the audiotrack has at least one attribute, and the at least one attribute comprises at least one of: a tone color of the audiotrack, a tone color library, a channel number, an input/output port, or a volume.

16. A non-transitory computer-readable storage medium for storing a computer program configured for controlling a scene sound effect, wherein the computer program is executed by a processor of electronic equipment to implement operations of:

determining whether an audiotrack of the electronic equipment has audio output, the audiotrack having a mapping relationship with an application in the electronic equipment;

in the case that it is determined that the audiotrack has audio output, establishing a communication connection with a server located at a network side and sending a query request to the server at the network side through the communication connection, the query request comprising a name of a client or a name of the application, and classification information of the client or classification information about classifying clients by names of applications being stored in the server at the network side;

receiving a type of the application returned by the server, the type of the application being determined by the server at the network side according to the classification information of the client or the classification information about classifying clients by names of applications;

acquiring a type of a scene sound effect corresponding to the type of the application; and setting a sound effect of the electronic equipment to be the scene sound effect corresponding to the type of the scene sound effect.

\* \* \* \* \*